A. COATES.

Lamp.

No. 643. Reissued Jan. 4, 1859.

N. PETERS, Photo-Lithographer, Washington, D. C.

UNITED STATES PATENT OFFICE.

ABRAHAM COATES, OF NEW YORK, N. Y.

IMPROVEMENT IN REGULATING THE FLOW OF OIL TO THE WICK IN CARCEL LAMPS.

Specification forming part of Letters Patent No. 14,492, dated March 25, 1856; Reissue No. 643, dated January 4, 1859.

*To all whom it may concern:*

Be it known that I, ABRAHAM COATES, of New York, in the county of New York and State of New York, have invented an Improvement in Regulating the Flow of Oil to the Wick in Carcel Lamps for Light-House Purposes; and I do hereby declare that the following is a full, clear, and exact description of the principle or character which distinguishes it from all other things before known, and of the usual manner of making, modifying, and using the same, reference being had to the accompanying drawings.

Figure 1:
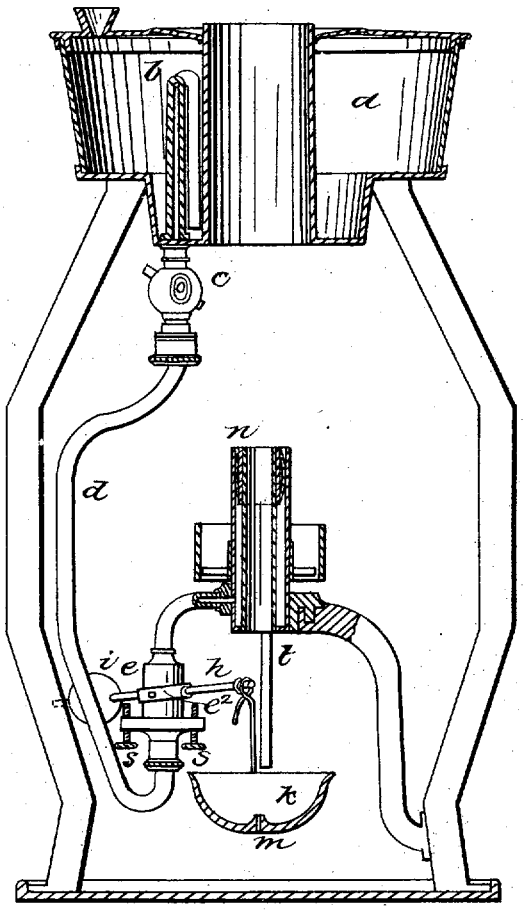
Figure 3:
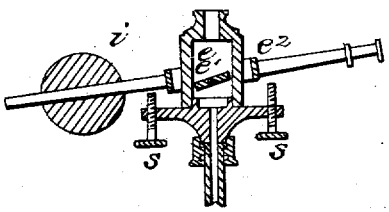
Figure 2:
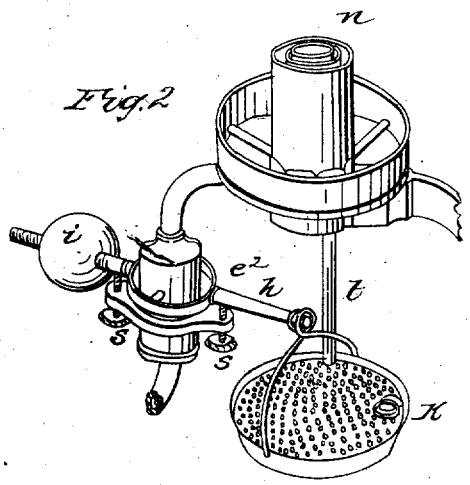

Figure 1 represents a vertical section through the whole apparatus; Fig. 2, a detached perspective of part of the lamp; and Fig. 3 represents a vertical section through the regulator.

My invention consists, first, in a mode of regulating the flow of oil to the wick in that class of lamps known as the "Carcel" lamp, or lamps in which the oil is made constantly to overflow the wick-tube, the construction and operation of which is as follows; and, second, in a mode of heating the oil for light-houses, as hereinafter described.

The lamp is designed chiefly for light-houses. The reservoir or fountain *a* is elevated at the height proper to give the required pressure, and within this is a siphon, *b*, the short leg of which terminates above the bottom of the reservoir, the long leg passing through the bottom of the reservoir and down to the wick-tube *n* of the lamp.

The object of the siphon-tube is to avoid impurities of the oil, which settle at the bottom of the fountain.

The flow of oil to the wick is regulated by the following automatic contrivance: In an enlargement, *e*, of the siphon-tube is a valve, *e'*, which is opened and closed by the axis of the gimbal $e^2$, connected with the balance-lever *h*. At one end of this lever is an adjustable weight, *i*, and at the other end a waste or drip cup, *k*. The waste-tube *t* conducts from the burner the overflowing oil to the drip-cup. The drip-cup is provided with a strainer to clean the oil, so that it may flow uniformly through the aperture *m*.

The self-regulation is effected as follows: The drip-cup is charged with oil to such an extent that with the adjustment of the weight *i* the valve *e'* will be sufficiently open to furnish the proper supply to the wick and waste through tube *t*. The set-screws *s s* are then adjusted so that the lever will not move so far in either direction as to cause either an excess of supply or cut off altogether. If from any cause the oil should flow too fast, it will fill the drip-cup faster than it can empty itself through aperture *m*, and the increased weight of the cup will cause that end of the lever to descend and diminish the valve-opening and lessen the supply. The cup will then empty itself to its proper level, return to its proper position, and thus regulate the flow of oil. If from any cause the flow should be too slow, the cup will empty itself faster than the cup is supplied with oil, and the consequence will be a further opening of the valve and a greater supply. It is important to the success of this mode of regulation that the oil should be kept pure.

The mode of heating the oil is as follows: The reservoir or fountain *a* is placed over or upon the top of the Froesnal lens A, and has a passage, B, through its center for the escape-draft of the lamp within the lens. A part of the vessel *a* descends within the lens, as seen at *a'*. By this arrangement the oil in *a* is kept constantly heated, and the fountain does not interfere at all with the operation of the lens.

It is not only an advantage at all times to keep the oil heated, but an economical arrangement for heating the oil, like that above, is of great importance in light-houses, where the oil is exposed to such intense cold. It will be seen by this arrangement of the fountain and the supply-pipe *d*, which is wholly within the chamber of the lens, that the oil is not exposed to any cooling influence on its passage from the fountain to the lamp.

What I claim as my invention and improvement in lamps in which the oil is forced to the wick so as to overflow is—

1. Regulating the supply of oil to the burner by means of the self-emptying drip-cup, operating upon the supply-valve, as herein set forth.

2. Placing the fountain or reservoir for the oil above the lens, with its draft opening B and its supply-pipe *d*, within the barrel or chamber of the lens, all arranged and operating substantially as set forth.

ABR. COATES.

Witnesses:

CHAS. G. PAGE,
WM. H. HARRISON.